US009654635B1

(12) United States Patent
Ho et al.

(10) Patent No.: US 9,654,635 B1
(45) Date of Patent: May 16, 2017

(54) CALL INITIATED SERVICE SESSION (71) Applicant: TP Lab, Inc., Palo Alto, CA (US)

(72) Inventors: Chi Fai Ho, Palo Alto, CA (US); Shin Cheung Simon Chiu, Palo Alto, CA (US)

(73) Assignee: TP Lab, Inc., Palo Alto, CA (US)

( * ) Notice: Subject to any disclaimer, the term of this patent is extended or adjusted under 35 U.S.C. 154(b) by 146 days.

(21) Appl. No.: 14/050,355

(22) Filed: Oct. 10, 2013

Related U.S. Application Data (63) Continuation of application No. 11/302,569, filed on Dec. 13, 2005.

(51) Int. Cl.
*H04M 3/06* (2006.01)
*H04M 3/51* (2006.01)

(52) U.S. Cl.
CPC ................ *H04M 3/5191* (2013.01)

(58) Field of Classification Search
CPC .. H04L 67/14; H04L 67/142; H04M 2242/14; H04M 3/5191
USPC ........................ 705/14.23; 370/353; 709/227; 379/265.09, 221.01
See application file for complete search history.

(56) References Cited

U.S. PATENT DOCUMENTS

| 5,764,736 | A  | * | 6/1998  | Shachar et al. ............ 379/93.09 |
| 6,301,480 | B1 | * | 10/2001 | Kennedy et al. ............ 455/445 |
| 7,082,191 | B1 | * | 7/2006  | Dickens ...................... 379/200 |
| 2003/0110266 | A1 | * | 6/2003 | Rollins et al. ................ 709/227 |
| 2005/0215228 | A1 | * | 9/2005 | Fostick ................... H04L 67/14 455/403 |
| 2006/0059125 | A1 | * | 3/2006 | Yan .......................... H04L 67/14 |
| 2006/0075110 | A1 | * | 4/2006 | Seraphin ...................... 709/227 |
| 2007/0037561 | A1 | * | 2/2007 | Bowen et al. ................ 455/418 |

\* cited by examiner

*Primary Examiner* — Ahmad F Matar
*Assistant Examiner* — Jirapon Intavong
(74) *Attorney, Agent, or Firm* — North Shore Patents, P.C.; Michele Liu Baillie (57) ABSTRACT

A method and system for providing a service session using a call include: initiating a first call between a caller and a callee according to a callee address record; establishing a voice communication session during the call; modifying the caller address record; and initiating a second call between the caller and the callee according to the modified callee address record. A behavior of the second call differs from a behavior of the first call. In one embodiment, the callee address record is modified according to a modification request. In one embodiment, the callee address record includes at least one session initiation entry. The session initiation entry includes a session address attribute with information for establishing the communication session, a session communication method with a protocol used for the communication session, and a session data attribute with data information for sending over the communication session based on the session address attribute.

22 Claims, 11 Drawing Sheets

A Process of making two Calls wherein a second Call is within a time period after a first Call Figure 1. A Call between a Caller and a Callee Figure 2. Callee Address Record Figure 3. A Process of establishing a Communication Session Figure 4. A Process of making a Call Figure 5. A Process of modifying a Callee Address Record during a Call Figure 6. A Process of making two Calls wherein a second Call is within a time period after a first Call Figure 7. A Process of making two Calls wherein a second Call is based on a Caller Address Record modified during a first Call Figure 8. An Enquiry Service Process using a Call Figure 9. An Product Ordering Process using a Call Figure 10. An Service Process based on a Callee assigned Identity using a Call Figure 11. An Service Call-waiting Process using a Call

CALL INITIATED SERVICE SESSION

CROSS-REFERENCE TO RELATED APPLICATIONS

This application is a continuation of co-pending U.S. patent application Ser. No. 11/302,569, filed on Dec. 13, 2005.

BACKGROUND OF THE INVENTION

Field

This invention relates generally to telecommunications, and more specifically, to a process to initiate a service session by making a call.

Related Art

Since the early 1970, new usages of voice communication have been introduced that allow a person to use a telephone to interact with a machine. Such usages are typically deployed for customer to business communication. In the simplest form, a person makes a telephone call to obtain information, such as location or business hours, from a recorded announcement machine of a merchant. Other more sophisticated usages include call center applications enabled by Interactive Voice Response (IVR) technologies. Such applications range from simple pin code authentication, merchandise ordering, ticket reservation, service scheduling, to complex class registration and financial transactions.

With the rapid commercialization of the Internet in the 1990s, a new form of customer to business communication emerges. A person can use a Web browser to obtain complex information from a business, and conduct sophisticated transactions, such as on-line shopping and on-line banking. This communication method has advantages over its voice counterpart, such as accurate data input, effective data presentation and navigation, no-loss data transmission, and mature security measures, such as on-demand data encryption and strong authentication methods.

Advanced data technologies, such as Customer Relationship Management (CRM) and client-side cookies, among others, further enhance customer to business interaction as communication and transactions history can be maintained beyond an autonomous communication session.

While providing convenience for customers, businesses manage and offer these methods of communication separately.

In one scenario, when a customer wishes to communicate with a business, he will have to decide whether to make a telephone call to the business' call center, or to connect to the business' Web site. In another scenario, while surfing the business' Web site, a customer may want to talk to a service representative of the business. In yet another scenario, while engaged in a telephone call with a service representative of a business, a customer may have a need to get information from the business' Web site. In one other scenario, a customer has made a reservation with a vacation resort over a telephone call, but will have to remember the Web site and a reservation number when she wants to find out updated details about the reservation.

The above scenarios illustrate the need to integrate voice and data communication between customers and businesses such that a customer can make a call to reach a business, automatically over voice communication, data communication, or both.

BRIEF SUMMARY OF THE INVENTION

A method and system for providing a service session using a call include: initiating a first call between a caller and a callee according to a callee address record; establishing a voice communication session during the call; modifying the callee address record; and initiating a second call between the caller and the callee according to the modified callee address record. A behavior of the second call differs from a behavior of the first call. In one embodiment, the callee address record is modified according to a modification request. In one embodiment, the callee address record includes at least one session initiation entry. The session initiation entry includes a session address attribute with information for establishing the communication session, a session communication method with a protocol used for the communication session, and a session data attribute with data information for sending over the communication session based on the session address attribute.

DETAILED DESCRIPTION OF THE INVENTION

A Call, a Caller, a Callee and Communication Sessions

Figure 1:
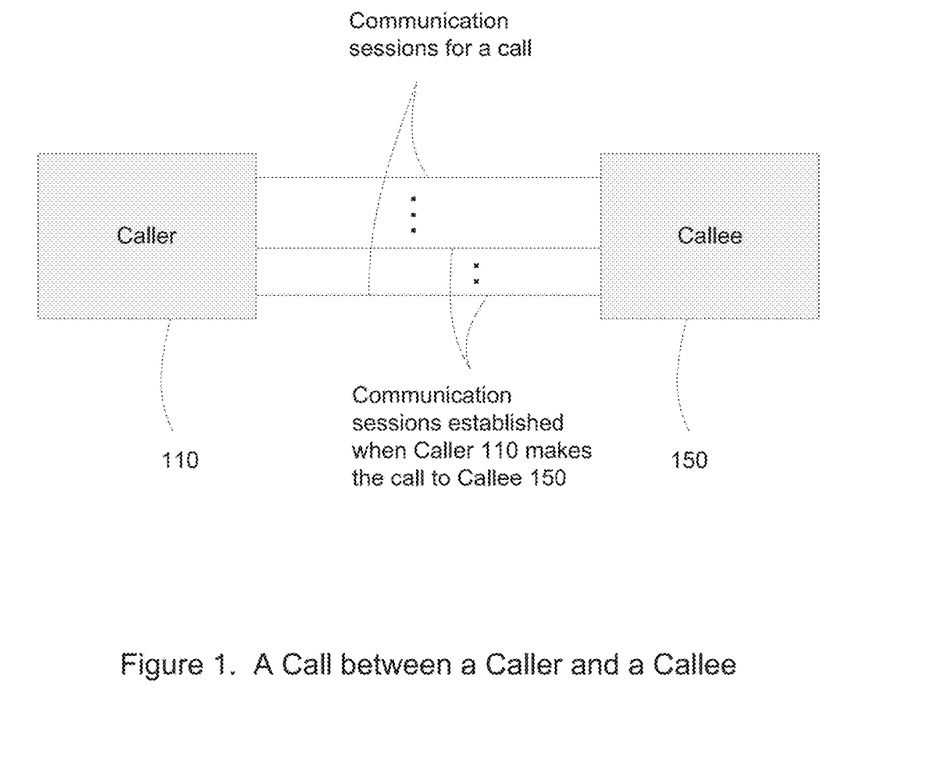
FIG. 1 illustrates a call between a Caller and a Callee.

FIG. 1 illustrates a call between a Caller and a Callee.

A call includes a plurality of communication sessions between Caller 110 and Callee 150. Caller 110 and Callee 150 include functionalities of processing a communication session. In one embodiment, processing a communication session includes establishing, maintaining and terminating a communication session.

In one embodiment, the plurality of communication sessions includes one or more communication sessions Caller 110 establishes with Callee 150 when Caller 110 makes the call to Callee 150.

In one embodiment, the plurality of communication sessions includes one or more communication sessions Caller 110 establishes with Callee 150 during the call.

During the call, Caller 110 and Callee 150 exchange information over the plurality of communication sessions.

A Callee Address Record

Figure 2:
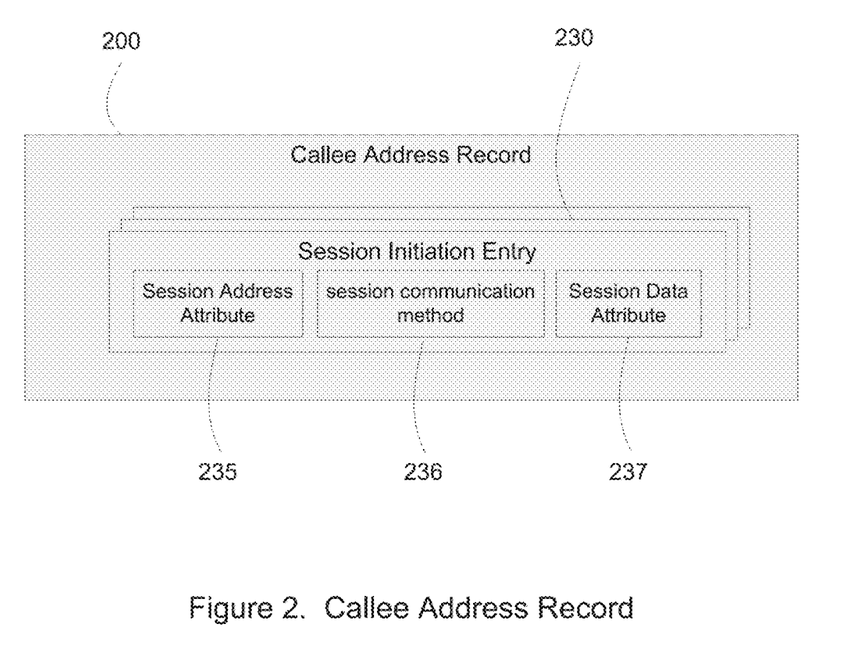
FIG. 2 illustrates a Callee Address Record.

FIG. 2 illustrates a Callee Address Record. A Callee Address Record is for a Callee 150.

Callee Address Record 200 includes a plurality of Session Initiation Entries 230. Each Session Initiation Entry 230 includes information for a communication session to the Callee. A Session Initiation Entry 230 includes a Session Address Attribute 235, a Session Data Attribute 237 and a session communication method 236.

Session Address Attribute 235 includes address information for establishing a communication session. In one embodiment, Session Address Attribute 235 includes a telephone number or a plurality of digits such as "4082130698". In another embodiment, Session Address Attribute 235 includes a Universal Resource Indicator (URI) as specified in IETF RFC 2396, such as "http://reservation.easydiner.com" and "ftp://megastore/info/shippingpolicy.txt". In yet another embodiment, Session Address Attribute 235 includes an Internet Protocol (IP) address such as "24.120.55.214". In one other embodiment, Session Address Attribute 235 includes an IP address and an IP port number such as "33.132.23.156:80". In one other embodiment, Session Address Attribute 235 includes a domain name as specified in IETF RFC 1034 and IETF RFC 1035, such as "info.ivysystem.net".

In one embodiment, Session Data Attribute 237 includes data information for sending over the communication session based on Session Address Attribute 235. In one embodiment, Session Data Attribute 237 includes a plurality of digits, such as "8096023", or "3365989853". In another embodiment, Session Data Attribute 237 includes a plurality of alphanumeric characters, such as "user=AE3092D; session=39485JD409" or "ID=JOHN-SMITH; ZIP-CODE=94023". In yet another embodiment, Session Data Attribute 237 includes an octet string, such as "AD357F6CCD34E6AB8724" as expressed in hexadecimal format.

Session communication method 236 includes a protocol used for a communication session. In one embodiment, session communication method 236 is determined based on Session Address Attribute 235. In one embodiment, Session Address Attribute 235 includes a URI such as "http://reservation.easydiner.com". Session communication method 236 includes the HTTP protocol. In one embodiment, Session Initiation Entry 230 includes a separate session communication method attribute 236. For example, Session Address Attribute 235 includes a telephone number; Session Initiation Entry 230 includes a session communication method attribute that includes a session communication method, such as "POTS", "SIP", "fax", "modem" or "Fax over IP".

In one embodiment, a Session Initiation Entry 230 includes an effective time information. In one embodiment, the effective time information includes a time of day; the Session Initiation Entry 230 becomes ineffective when the current time of day is after the effective time information. Caller does not establish a communication session based on an ineffective Session Initiation Entry.

In one embodiment, the effective time information includes a time period; the Session Initiation Entry 230 is ineffective when the current time of day is outside the effective time information.

In one embodiment, a Datastore stores a plurality of Callee Address Records 200. In one embodiment, Caller includes the Datastore. In another embodiment, Caller connects to the Datastore. In one embodiment, Caller connects to the Datastore via a network, such as an Ethernet network, a home WiFi network, an Internet Protocol (IP) network, or the Internet. In another embodiment, Caller connects to the Datastore via a plurality of networks.

In one embodiment, the Datastore includes a flash memory. In another embodiment, the Datastore includes a hard disk. In yet another embodiment, the Datastore includes a memory. In one other embodiment, the Datastore includes a database.

A Process of Establishing a Communication Session

Figure 3:
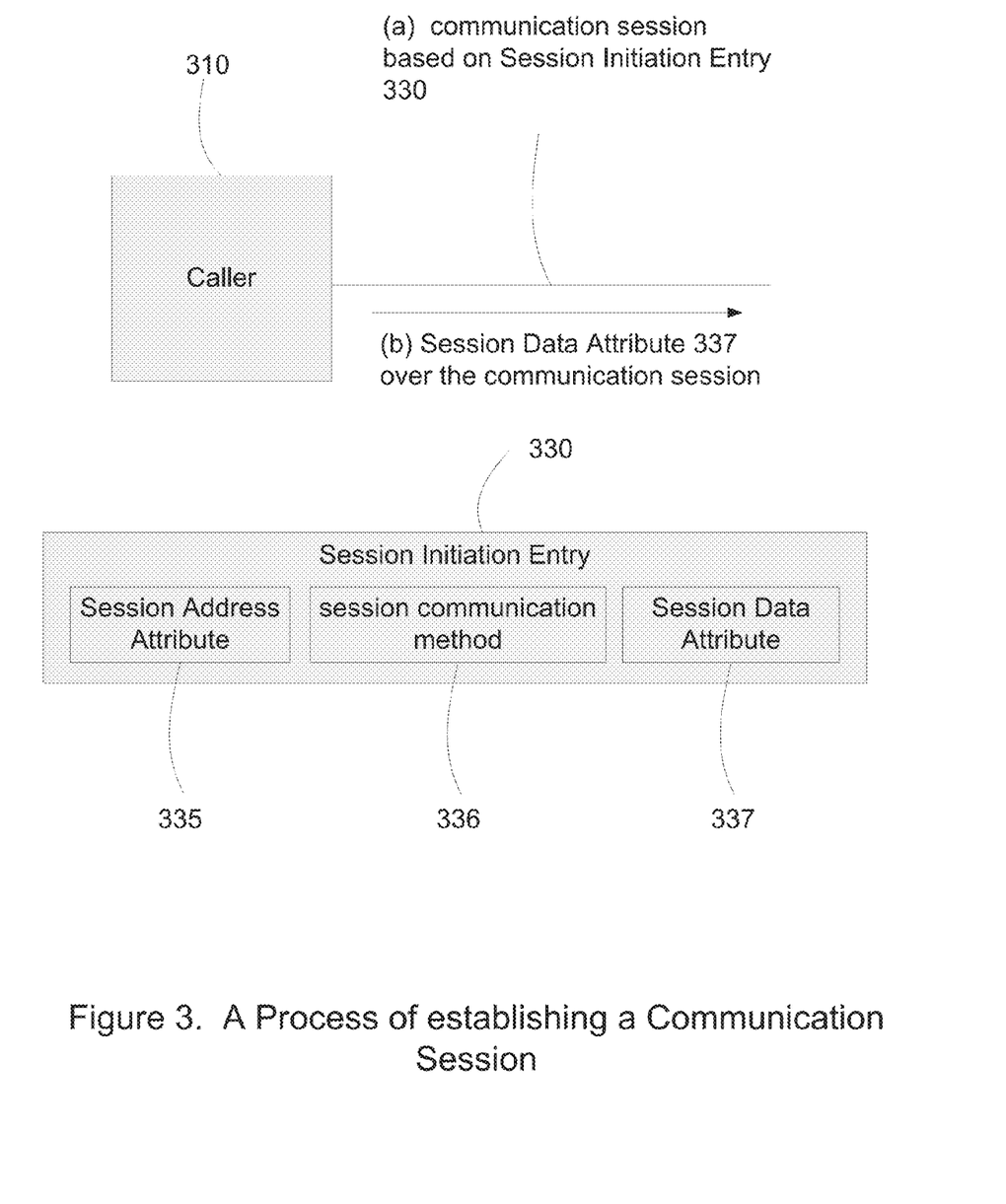
FIG. 3 illustrates a process of establishing a communication session based on a Session Initiation Entry.

FIG. 3 illustrates a process of establishing a communication session based on a Session Initiation Entry.

Caller 310 establishes a communication session based on a Session Initiation Entry 330 (step (a)). Session Initiation Entry 330 includes Session Address Attribute 335, a session communication method 336 and Session Data Attribute 337.

In one embodiment, Caller 310 establishes a communication session based on Session Address Attribute 335 and session communication method 336. In one embodiment, Session Address Attribute 335 includes a URI "http://reservation.easydiner.com". In one embodiment, Caller 310 establishes a communication session using session communication method 336 "http" and the URI "http://reservation.easydiner.com".

In one embodiment, Session Address Attribute 335 includes a telephone number "450-111-2222" and session communication method 336 "POTS". Caller 310 establishes a communication session using session communication method 336 "POTS" and the telephone number "450-111-2222".

In one embodiment, Caller 310 sends the data information in Session Data Attribute 337 over the communication session (step (b)).

In one embodiment, Caller 310 sends the data information in Session Data Attribute 337 during the set up time of the communication session. In one embodiment, the communication session is an HTTP communication session. In one example, Caller 310 includes the data information in Session Data Attribute 337 in a cookie header of an HTTP Request. Caller 310 sends the HTTP Request to establish the HTTP communication session. In another embodiment, the communication session is a Real Time Streaming Protocol (RTSP) communication session. In one example, Caller 310 includes the data information in Session Data Attribute 337 in a proprietary header of an RTSP SETUP Message. Caller 310 sends the RTSP SETUP Message to establish the RTSP communication session.

In another embodiment, Caller 310 sends the data information in Session Data Attribute 337 after the communication session is established. In one example, the communication session is based on session communication method "POTS". In one embodiment, Caller 310 sends the data information in Session Data Attribute 337 in the form of Dual Tone Multiple Frequency (DTMF) tones after the communication session is established. In another example, the communication session is based on session communication method "SIP". In one embodiment, Caller 310 sends the data information in Session Data Attribute 337 in a SIP INFO Message after the communication session is established.

A Process of Making a Call

Figure 4:
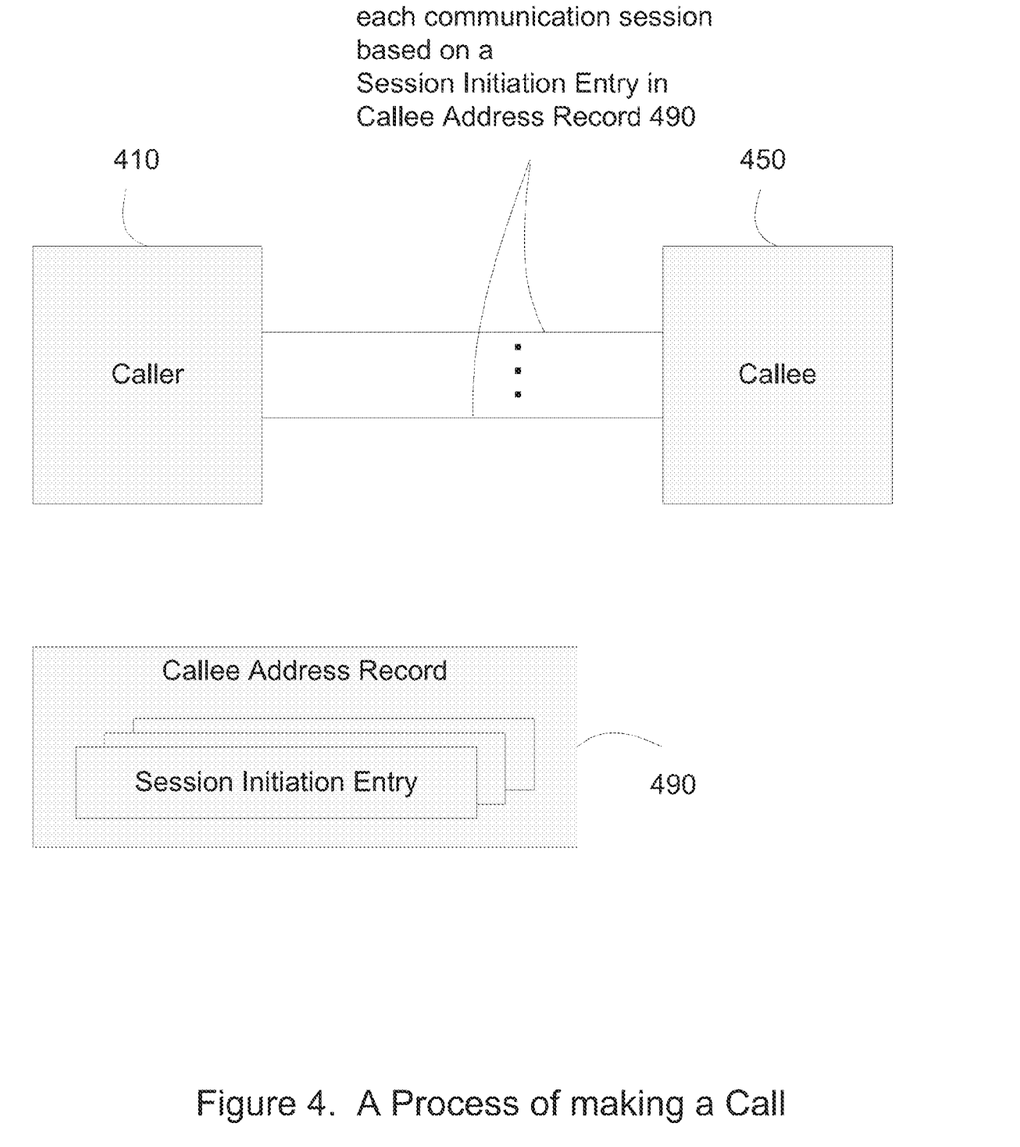
FIG. 4 illustrates a process of making a call.

FIG. 4 illustrates a process of making a call.

Caller 410 makes a call to Callee 450 using Callee Address Record 490. Callee Address Record 490 is for Callee 450. Caller 410 establishes a plurality of communication sessions to Callee 450 based on the plurality of Session Initiation Entry in Callee Address Record 490.

For each Session Initiation Entry in Callee Address Record 490, Caller 410 establishes a communication session to Callee 450 as illustrated in FIG. 3.

A Process of Modifying a Callee Address Record During a Call

Figure 5:
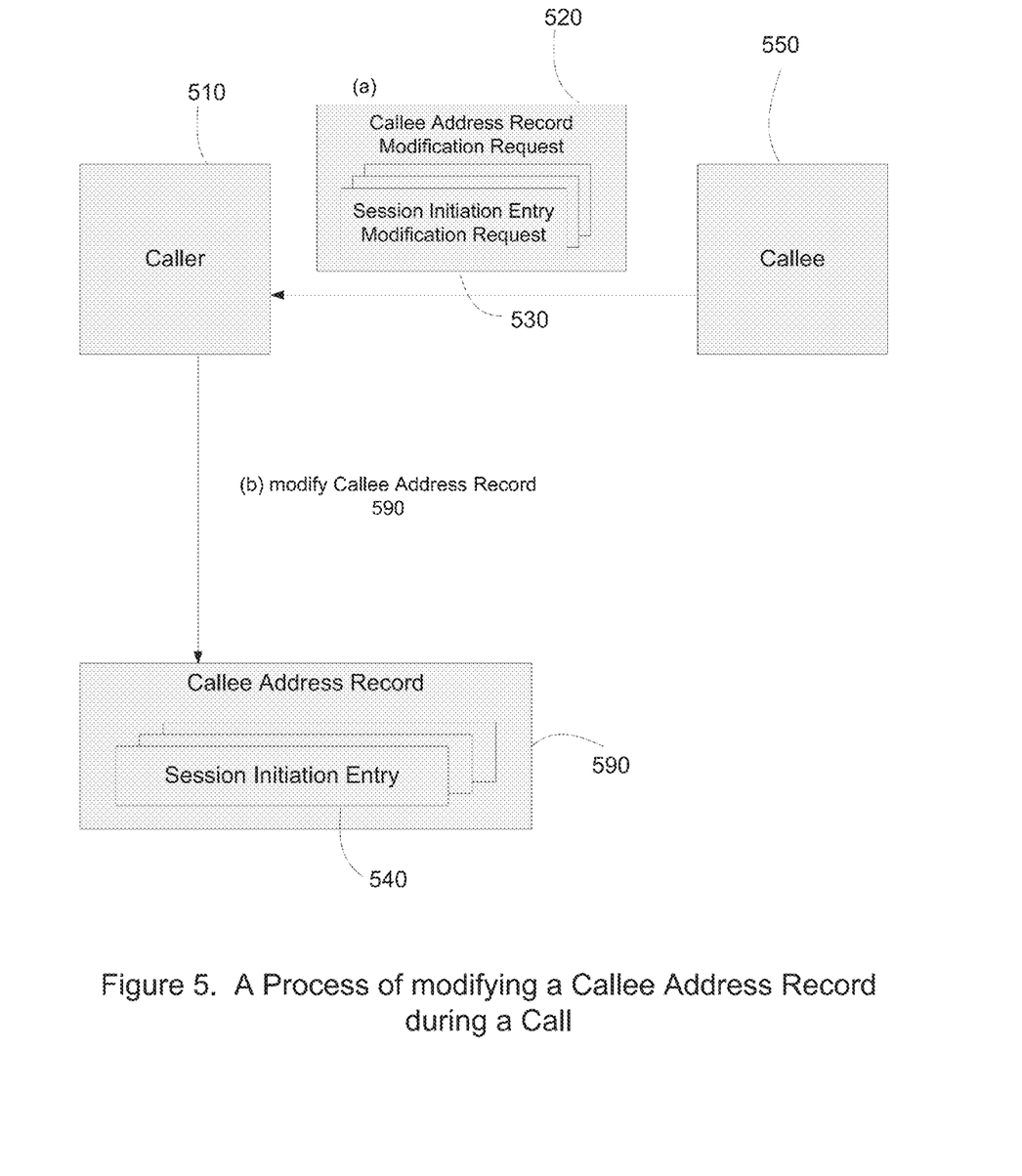
FIG. 5 illustrates a process of modifying a Callee Address Record during a call.

FIG. 5 illustrates a process of modifying a Callee Address Record during a call.

Caller 510 makes a call to Callee 550 using Callee Address Record 590. Caller 510 establishes a plurality of communication sessions to Callee 550 based on Callee Address Record 590.

During the call, Caller 510 receives from Callee 550 a Callee Address Record Modification Request 520 (step (a)). A Callee Address Record Modification Request 520 is a request for the modification of a Callee Address Record. In one embodiment, the Callee Address Record Modification Request 520 is for the modification of Callee Address Record 590. In one embodiment, the request 520 includes a plurality of Session Initiation Entry Modification Request 530. A Session Initiation Entry Modification Request 520 is a request for the modification of a Session Initiation Entry. For each Session Initiation Entry Modification Request 530 in the Callee Address Record Modification Request 520, Caller 510 modifies the respective Session Initiation Entry 540 in Callee Address Record 590 (step (b)).

In one embodiment, a Session Initiation Entry Modification Request 530 includes two Session Initiation Entry Indications (not shown). In one embodiment, a Session Initiation Entry Indication includes a Session Initiation Entry. In another embodiment, a Session Initiation Entry Indication does not include a Session Initiation Entry.

In one embodiment, the Session Initiation Entry Modification Request 530 is for the removal of a Session Initiation Entry. In one embodiment, the first Session Initiation Entry Indication includes a Session Initiation Entry and the second Session Initiation Entry Indication does not include a Session Initiation Entry. Caller 510 removes from Callee Address Record 590 a Session Initiation Entry 540 that matches the Session Initiation Entry in the first Session Initiation Entry Indication.

In another embodiment, the Session Initiation Entry Modification Request 530 is for the addition of a Session Initiation Entry. In one embodiment, the first Session Initiation Entry Indication does not include a Session Initiation Entry and the second Session Initiation Entry Indication includes a Session Initiation Entry. Caller 510 adds to Callee Address Record 590 the Session Initiation Entry 540 in the second Session Initiation Entry Indication.

In one other embodiment, the Session Initiation Entry Modification Request 530 is for the replacement of a Session Initiation Entry. In one embodiment, the first Session Initiation Entry Indication includes a first Session Initiation Entry and the second Session Initiation Entry Indication includes a second Session Initiation Entry. Caller 510 replaces in Callee Address Record 590 a Session Initiation Entry 540 that matches the first Session Initiation Entry with the second Session Initiation Entry.

Figure 6:
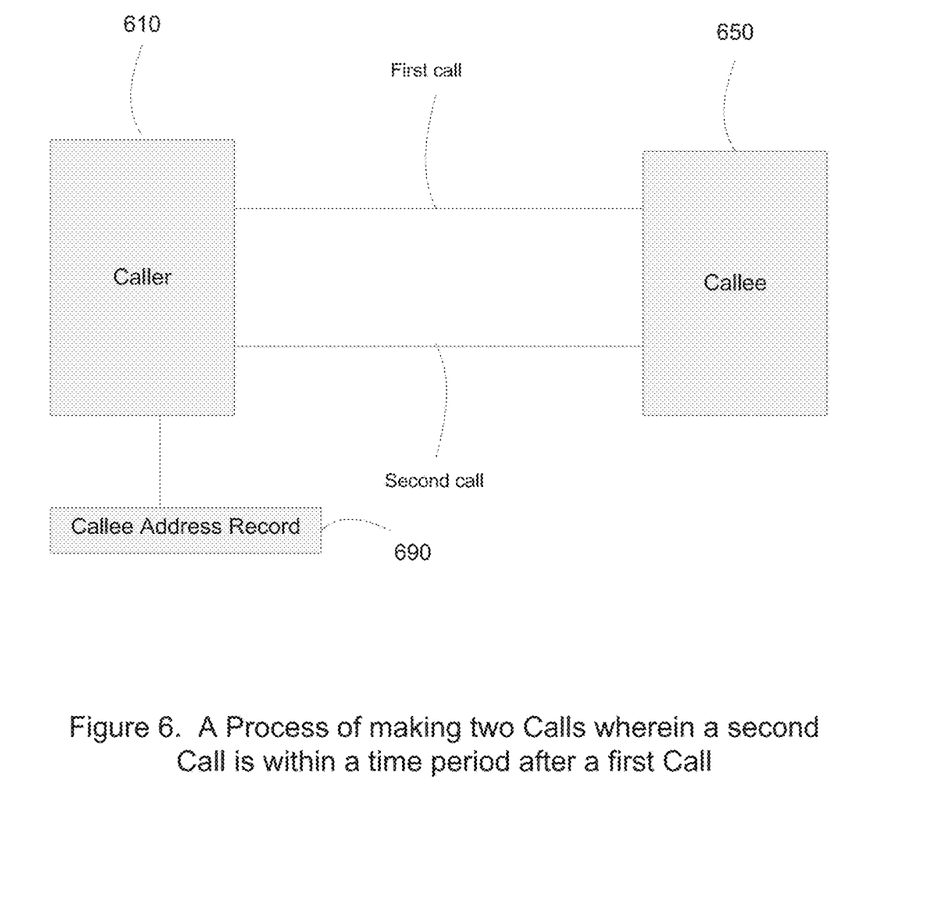
FIG. 6 illustrates a process of making two calls wherein a second call is within a time period from a first call.

A Process of Making Two Calls Wherein a Second Call is within a Time Period from a First Call FIG. 6 illustrates a process of making two calls wherein a second call is within a time period from a first call.

Caller 610 Makes a First Call to Callee 650 Using Callee Address Record 690.

During the first call, in one embodiment, Caller 610 receives a time period information from Callee 650. In one embodiment, Caller 610 further receives an indication to call within the time period from the first call. The callee 650 stores information for Caller's second call. In one embodiment, the time period is 30 minutes. In another embodiment, the time period is 55 minutes. In yet another embodiment, the time period is 2 day 8 hours.

During the first call, in another embodiment, Caller 610 sends a time period information to Callee 650. In one embodiment, Caller 610 further sends an indication to call within the time period from the first call. In one embodiment, the time period is 25 minutes. In another embodiment, the time period is 46 minutes. In yet another embodiment, the time period is 1 day 6 hours.

Within the time period from the first call, Caller 610 makes a second call to Callee 650 using Callee Address Record 690. The behavior of the second call is different from the first call according to the information for the second call, stored at the Callee 650.

Figure 7:
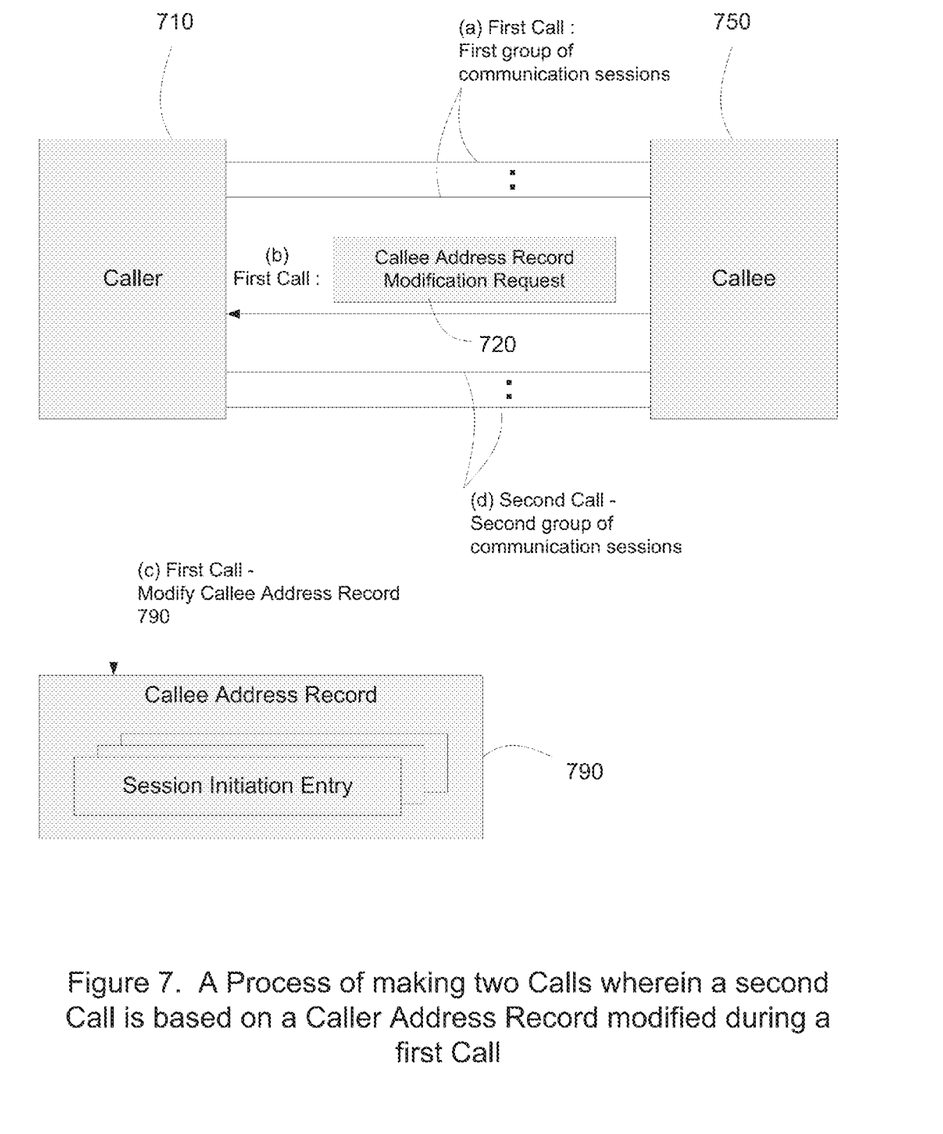
FIG. 7 illustrates a process of making two calls wherein a second call uses a Callee Address Record that is modified during a first call.

A Process of Making Two Calls Wherein a Second Call is Based on a Callee Address Record that is Modified During a First Call FIG. 7 illustrates a process of making two calls wherein a second call uses a Callee Address Record that is modified during a first call.

Caller 710 makes a first call to Callee 750 using Callee Address Record 790 (step (a)). Caller 710 processes a first group of communication sessions with Callee 750. The first group of communication sessions includes the plurality of communication sessions based on Callee Address Record 790. During the first call, Caller 710 and Callee 750 exchange information over the first group of communication sessions.

Caller 710 receives from Callee 750 a Callee Address Record Modification Request 720 for Callee Address Record 790 (step (b)). Caller 710 modifies Callee Address Record 790 based on the Callee Address Record Modification Request as illustrated in FIG. 5 (step (c)).

Caller 710 makes a second call to Callee 750 using the modified Callee Address Record 790 (step (d)). Caller 710 processes a second group of communication sessions with Callee 750. The second group of communication sessions includes the plurality of communication sessions based on the modified Callee Address Record 790. During the second call, Caller 710 and Callee 750 exchange information over the second group of communication sessions.

In one embodiment, the second group of communication sessions is different from the first group of communication sessions.

In one embodiment, during the first call, the Callee Address Record Modification Request 720 is for the removal of a Session Initiation Entry. The first group of communication sessions includes a communication session based on the removed Session Initiation Entry, and the second group of communication sessions does not include a communication session based on the removed Session Initiation Entry.

In another embodiment, during the first call, the Callee Address Record Modification Request 720 is for the addition of a Session Initiation Entry. The first group of communication sessions does not include a communication session based on the added Session Initiation Entry, and the second group of communication sessions includes a communication session based on the added Sessions Initiation Entry.

In one other embodiment, during the first call, the Callee Address Record Modification Request 720 is for the replacement of a first Session Initiation Entry with a second Session Initiation Entry. In one embodiment, the first Session Address Attribute or the first session communication method in the first Session Initiation Entry is different from the second Session Address Attribute or the second session communication method in the second Session Initiation Entry. The first group of communication sessions includes the communication session based on the first Session Address Attribute and the first session communication method. The second group of communication sessions includes the communication session based on the second Session Address Attribute and the second session communication method. In another embodiment, the first Session Data Attribute in the first Session Initiation Entry is different from the second Session Data Attribute in the second Session Initiation Entry. Over the communication session based on the first Session Initiation Entry, Caller 710 sends the first Session Data Attribute. Over the communication session based on the second Session Initiation Entry, Caller 710 sends the second Session Data Attribute.

An Enquiry Service Process Using a Call

Figure 8:
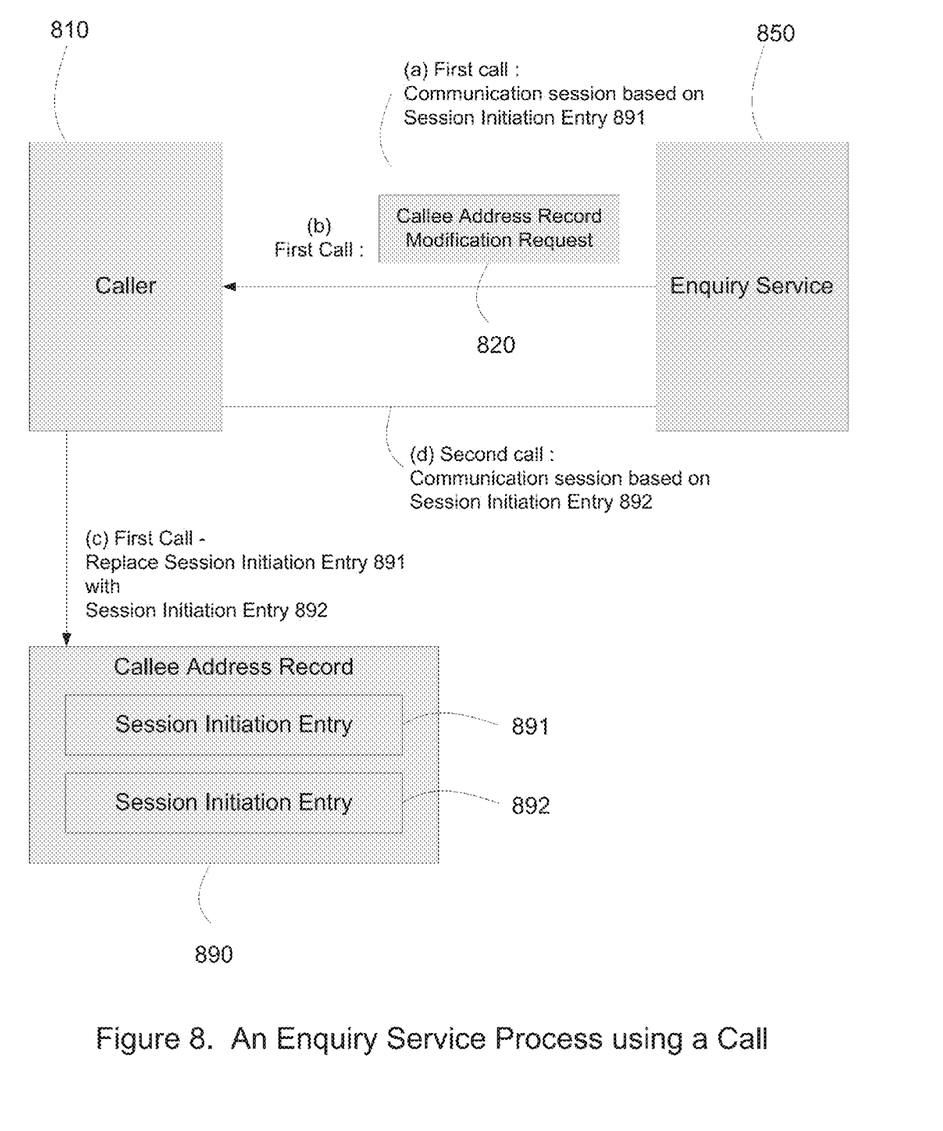
FIG. 8 illustrates an enquiry service process using a call.

FIG. 8 illustrates an enquiry service process using a call. An Enquiry Service provides information to a Caller. In this illustration, Enquiry Service 850 provides business contact information.

Caller 810 makes a first call to Enquiry Service 850 using Callee Address Record 890 for Enquiry Service 850 (step (a)). Callee Address Record 890 includes a Session Initiation Entry 891. In one embodiment, Session Initiation Entry 891 includes Session Address Attribute with a telephone number "408-223-1234" and session communication method "SIP". Caller 810 establishes a communication session to Enquiry Service 850 using the telephone number "408-223-1234" and the session communication method "SIP".

Caller 810 receives a request from Enquiry Service 850 for caller information. Caller 810 sends the caller information to Enquiry Service 850. In one embodiment, the caller information includes the name of a city "Mountain View, Calif.". Caller 810 receives a request from Enquiry Service 850 for the name of a business. Caller 810 sends the name of a business, for example "Grasshopper Nursery" to Enquiry Service 850. Caller 810 receives from Enquiry Service 850 a telephone number of Grasshopper Nursery at Mountain View, Calif.

Caller 810 receives from Enquiry Service 850 a Callee Address Record Modification Request 820 for the modification of Callee Address Record 890 (step (b)). In one embodiment, the Callee Address Record Modification Request 820 includes a Session Initiation Entry Modification Request for the replacement of Session Initiation Entry 891 with Session Initiation Entry 892. Session Initiation Entry 892 includes Session Address Attribute with a telephone number "408-223-5678", session communication method "SIP", and Session Data Attribute "City=Mountain View/California". In one embodiment, the Session Data Attribute corresponds to the caller information.

Caller 810 replaces Session Initiation Entry 891 with Session Initiation Entry 892 (step (c)).

Later, Caller 810 makes a second call to Enquiry Service 850 using the modified Callee Address Record 890 (step (d)). The modified Callee Address Record 890 includes Session Initiation Entry 892. Caller 810 establishes a communication session to Enquiry Service 850 using the telephone number "408-223-5678" and the session communication method "SIP". Over the communication session, Caller 810 sends the Session Data Attribute "City=Mountain View/California" to Enquiry Service 850.

Caller 810 receives a request from Enquiry Service 850 for the name of a business. Caller 810 sends "Saturday Hardware". Caller 810 receives from Enquiry Service 850 a telephone number of Saturday Hardware at Mountain View, Calif.

Similar to the illustration in FIG. 8, Enquiry Service provides other information for a Caller.

In one embodiment, the Session Data Attribute in the replaced Session Data Attribute corresponds to the caller information.

In one embodiment, Enquiry Service 850 provides traffic condition information. In one embodiment, the caller information includes a location, such as a name of a highway. In the second call, Caller 810 receives from Enquiry Service 850 traffic condition information about the highway. In another embodiment, the caller information includes a start address and a destination address. In the second call, Caller 810 receives from Enquiry Service 850 traffic condition information from the start address to the destination address.

In one embodiment, Enquiry Service 850 provides weather information. In one embodiment, the caller information includes a location, such as a name of a city, a town, a ski resort, or a beach. In the second call, Caller 810 receives from Enquiry Service 850 weather information about the location.

In one embodiment, Enquiry Service 850 provides event information. In one embodiment, the caller information includes a personal interest, such as a sport, a hobby, a name of a rock band or a name of a religion. In the second call, Caller 810 receives from Enquiry Service 850 event information, such as information about ball games, exhibitions, conferences, concert, or church services based on the personal interest.

In one embodiment, Enquiry Service 850 provides advertisement and promotion information. In one embodiment, the caller information includes a location, such as a name of a city, a shopping mall or a highway exit. In one embodiment, the other caller includes a personal interest for products or services, such as Chinese food, sports equipment, five-star hotels. In the second call, Caller 810 receives from Enquiry Service 850 advertisement and promotion information based on the location and the personal interest. In one embodiment, the location includes Stanford Shopping Center, and the personal interest includes baby's clothing. In the second call, Caller 810 receives from Enquiry Service 850 advertisement information for Baby Blue Boutique at the northwest corner of Stanford Shopping Center. In another embodiment, the location includes a name of a highway exit and a direction of travel, and the personal interest includes pizza. In the second call, in one embodiment, Caller 810 receives from Enquiry Service 850 advertisement information for LazerFast Pizza located 10 miles from the highway exit in the direction of travel. In another embodiment, Caller 810 receives from Enquiry Service 850 advertisement information for Honest Pizza located 6 miles from the highway exit in the direction of travel.

A Product Ordering Process Using a Call

Figure 9:
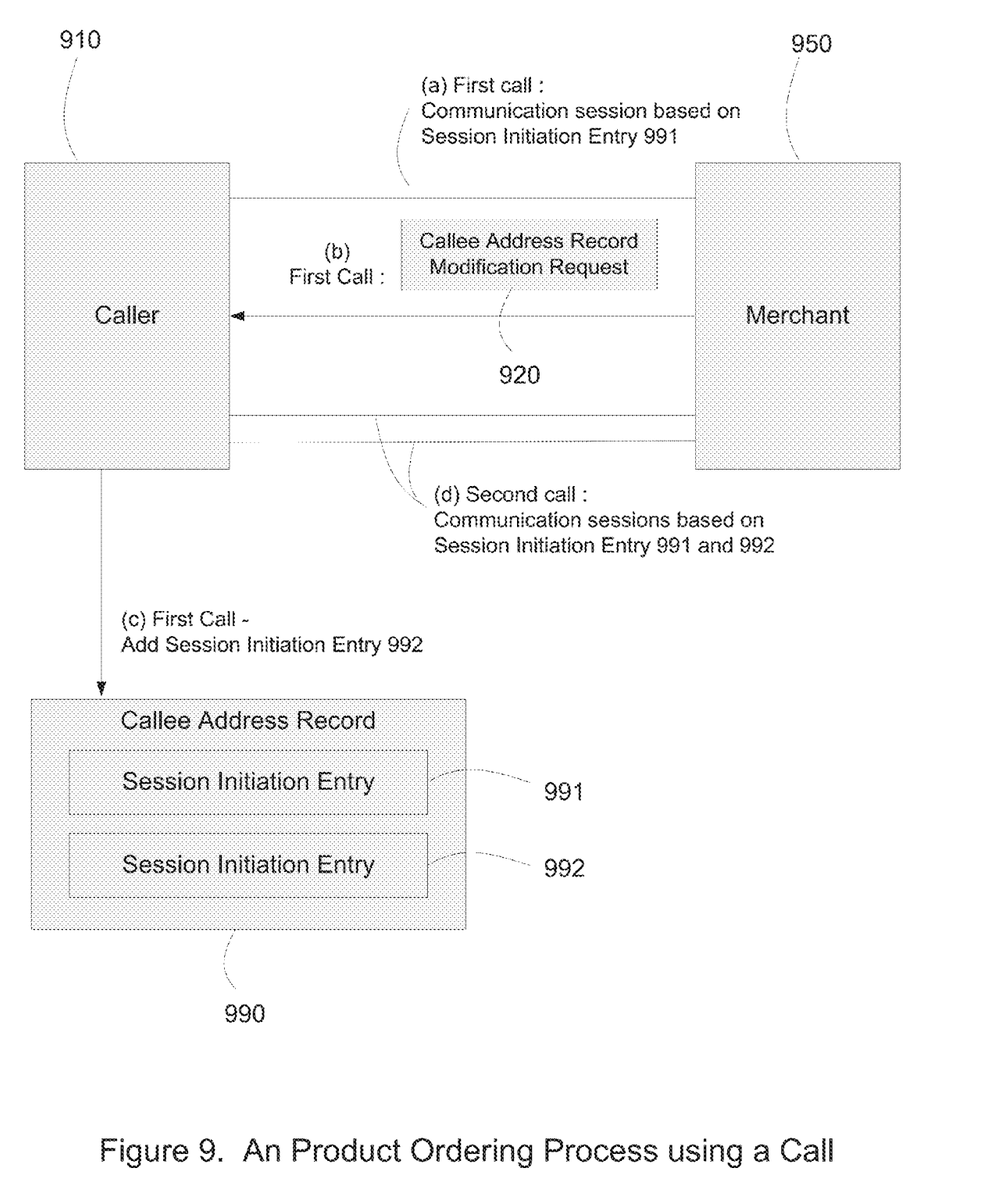
FIG. 9 illustrates a product ordering process using a call.

FIG. 9 illustrates a product ordering process using a call. In this illustration, Merchant 950 allows a Caller 910 to order products using a call.

Caller 910 makes a first call to Merchant 950 using Callee Address Record 990 (step (a)). Callee Address Record 990 includes a Session Initiation Entry 991. In one embodiment, Session Initiation Entry 991 includes Session Address Attribute with a telephone number "650-354-6293" and session communication method "SIP". Caller 910 establishes a communication session to Merchant 950 using the telephone number "650-354-6293" and the session communication method "SIP".

Caller 910 provides to Merchant 950 order information. The order information includes the ordered products. In one embodiment, the order information includes a recipient name "Mary Logan". In one other embodiment, the order information includes a street address for the delivery of the ordered products.

Caller 910 receives from Merchant 950 a Callee Address Record Modification Request 920 for the modification of Callee Address Record 990 (step (b)). In one embodiment, the Callee Address Record Modification Request 920 includes a Session Initiation Entry Modification Request for the addition of Session Initiation Entry 992. In one embodiment, Session Initiation Entry 992 includes Session Address Attribute with a URI "http://ordertrackinglaserfastpizza.com/orderr and Session Data Attribute with "ORDER_NUMBER=067498735". In one embodiment, the Session Data Attribute corresponds to the order.

Caller 910 adds Session Initiation Entry 992 to Callee Address Record 990 (step (c)).

Later, Caller 910 makes a second call to Merchant 950 using Callee Address Record 990 (step (d)). The modified Callee Address Record 990 includes Session Initiation Entries 991 and 992.

Caller 910 establishes a first communication session to Merchant 950 based on Session Initiation Entry 991 in a similar manner as in the first call.

Caller 910 establishes a second communication session to Merchant 950 based on Session Initiation Entry 992. In one embodiment, Caller 910 composes an HTTP GET Request using the URI "http://ordertracking.laserfastpizza.com/order/", and includes "ORDER_NUM=067498735" in a cookie header in the HTTP GET Request. Caller 910 sends the HTTP GET Request to Merchant 950.

Caller 910 receives from Merchant 950 a Web page over the second communication session. In one embodiment, the Web page includes information about the order. In one embodiment, Caller 910 receives a greeting from Merchant 950 over the first communication session, "Dear Mary Logan, our deliveryman Joe Leach is on his way, and will arrive at approximately 12:35 pm. We at Laser Fast Pizza thank you for your business."

In one embodiment, other business processes are variations of the Product Ordering Process.

In one embodiment, Caller 910 and Merchant 950 carries out a business process in the first call. The Session Data Attribute in the added Session Initiation Entry during the first call includes progress information about the business process. In one embodiment, the business process includes multiple steps. In one embodiment, Caller 910 and Merchant 950 complete the first and second steps of the process in the first call. In one embodiment, the Session Data Attribute include progress information "PROCESS-NUM=2361; STEP=2".

In a second call, Caller 910 sends the progress information "PROCESS-NUM=2361; STEP=2" to Merchant 950. Caller 910 and Merchant 950 resume the business process at the third step.

In one embodiment, Caller 910 and Merchant 950 continue the business process in additional calls in a similar manner. For example, Caller 910 and Merchant 950 complete the third, fourth, and fifth steps of the process in the second call. During the second call, in one embodiment, Caller 910 receives a Callee Address Record Modification Request for the replacement of a Session Initiation Entry. The Session Data Attribute in the replaced Session Initiation Entry includes progress information "PROCESS-NUM=2361; STEP=5". In a third call, Caller and Callee resume the business process at the sixth step.

In one embodiment, Caller 910 corresponds to a customer and Merchant 950 corresponds to a business. Caller 910 and Merchant 950 carry out a customer-to-business process. In another embodiment, Caller 910 corresponds to a business and Merchant 950 corresponds to another business. Caller 910 and Merchant 950 carry out a business-to-business process. In one other embodiment, Caller 910 corresponds to an employee of a business and Merchant 950 corresponds to a service within the business. Caller 910 and Merchant 950 carry out an employee-to-service process.

A Service Process Based on a Callee Assigned Identity Using a Call

Figure 10:
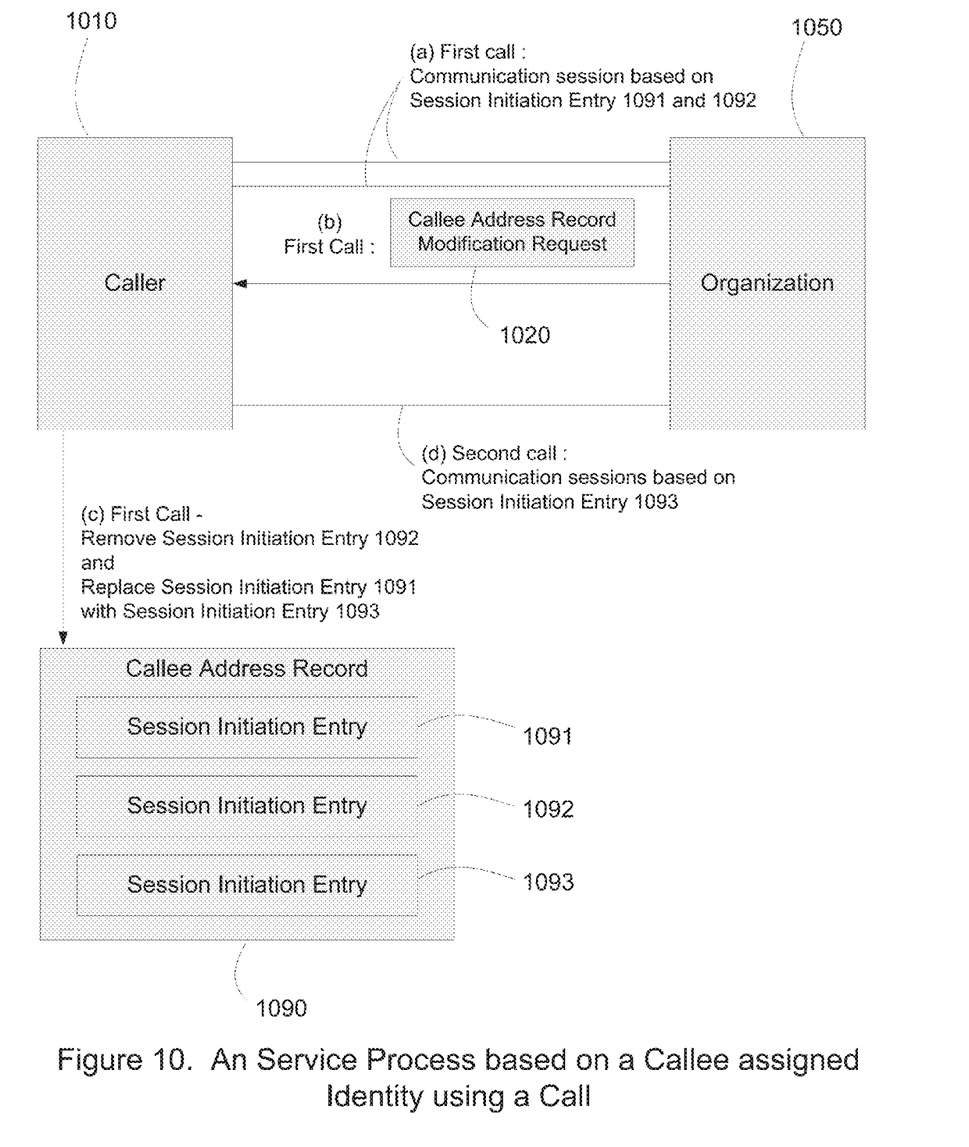
FIG. 10 illustrates a service process based on a Callee assigned identity during a call.

FIG. 10 illustrates a service process based on a Callee assigned identity during a call. In this illustration, Organization 1050 provides services to a Caller. The service process depends on if a Caller is a member of Organization 1050. Organization 1050 provides non-member service to a Caller who is not a member of Organization 1050, and provides membership service to a Caller who is a member of Organization 1050.

In this illustration, a Caller 1010 is not a member of Organization 1050.

Caller 1010 makes a first call to Organization 1050 using Callee Address Record 1090 (step (a)). Callee Address Record 1090 includes a Session Initiation Entry 1091 and a Session Initiation Entry 1092. In one embodiment, Session Initiation Entry 1091 includes Session Address Attribute with a telephone number "510-200-3000" and session communication method "POTS". Session Initiation Entry 1092 includes Session Address Attribute with a URI "http://www.ivygreengolfclub.org". Caller 1010 establishes a first communication session to Organization 1050 using the telephone number "510-200-3000" and the session communication method "POTS". Caller 1010 establishes a second communication session to Organization 1050 using the URI "http://www.ivygreengolfclub.org".

Caller 1010 receives non-member service from Organization 1050 during the first call.

In one embodiment, during the first call, over the first communication session, Caller 1010 receives a recorded voice message from Organization 1050 introducing the benefits of joining Organization 1050. Over the second communication session, Caller 1010 receives information about Organization 1050 from a Web page Organization 1050 sends. Caller 1010 becomes a member of Organization 1050. Caller 1010 provides information to Organization 1050. In one embodiment, the information includes a name "David Rice". In another embodiment, the information includes personal preference.

Caller 1010 receives from Organization 1050 a Callee Address Record Modification Request 1020 for the modification of Callee Address Record 1090 (step (b)). In one embodiment, the Callee Address Record Modification Request 1020 includes a Session Initiation Entry Modification Request for the removal of Session Initiation Entry 1092, and a Session Initiation Entry Modification Request for the replacement of Session Initiation Entry 1091 with Session Initiation Entry 1093. In one embodiment, Session Initiation Entry 1093 includes Session Address Attribute with a telephone number "510-200-8888", session communication method "POTS", and Session Data Attribute with "MEMBER_NUM=1243600". In one embodiment, the Session Data Attribute corresponds to membership information.

Caller 1010 removes Session Initiation Entry 1092 from Callee Address Record 1090 and replaces Session Initiation Entry 1091 with Session Initiation Entry 1093 (step (c)).

Later, Caller 1010 makes a second call to Organization 1050 using Callee Address Record 1090 (step (d)). The modified Callee Address Record 1090 includes Session Initiation Entry 1093. Caller 1010 establishes a communication session to Organization 1050 using the telephone number "510-200-8888" and session communication method "POTS". Caller 1010 sends "MEMBER_NUM=1243600" to Organization 1050 over the communication session.

Caller 1010 receives member service from Organization 1050 during the second call.

In one embodiment, Caller 1010 receives a greeting from a service representative of Organization 1050 over the communication session, "Hi, Mr. Rice, welcome to Ivy Green Golf Club. We have a promotion for new member like you and I would be delighted to introduce to you these great services and discount that fits your personal preference . . . "

In one embodiment, Organization 1050 provides services to a Caller 1010. The service process depends on if a Caller 1010 is an existing customer. In one embodiment, the service process depends on a Callee assigned customer identity.

In one embodiment, Caller 1010 is not an existing customer when Caller 1010 makes the first call to Organization 1050.

In one embodiment, the Session Data Attribute in the replaced Session Initiation Entry includes a Callee assigned customer identity. In one embodiment, the Session Data Attribute includes the Callee assigned customer identity "CUSTOMER-ID=9808765".

In the second call, Caller 1010 receives service from Organization 1050 as an existing customer. In one embodiment, Caller 1010 receives specific service from Organization 1050 as the existing customer based on the Callee assigned customer identity "CUSTOMER-ID=9808765".

A Service Call-Waiting Process Using a Call

Figure 11:
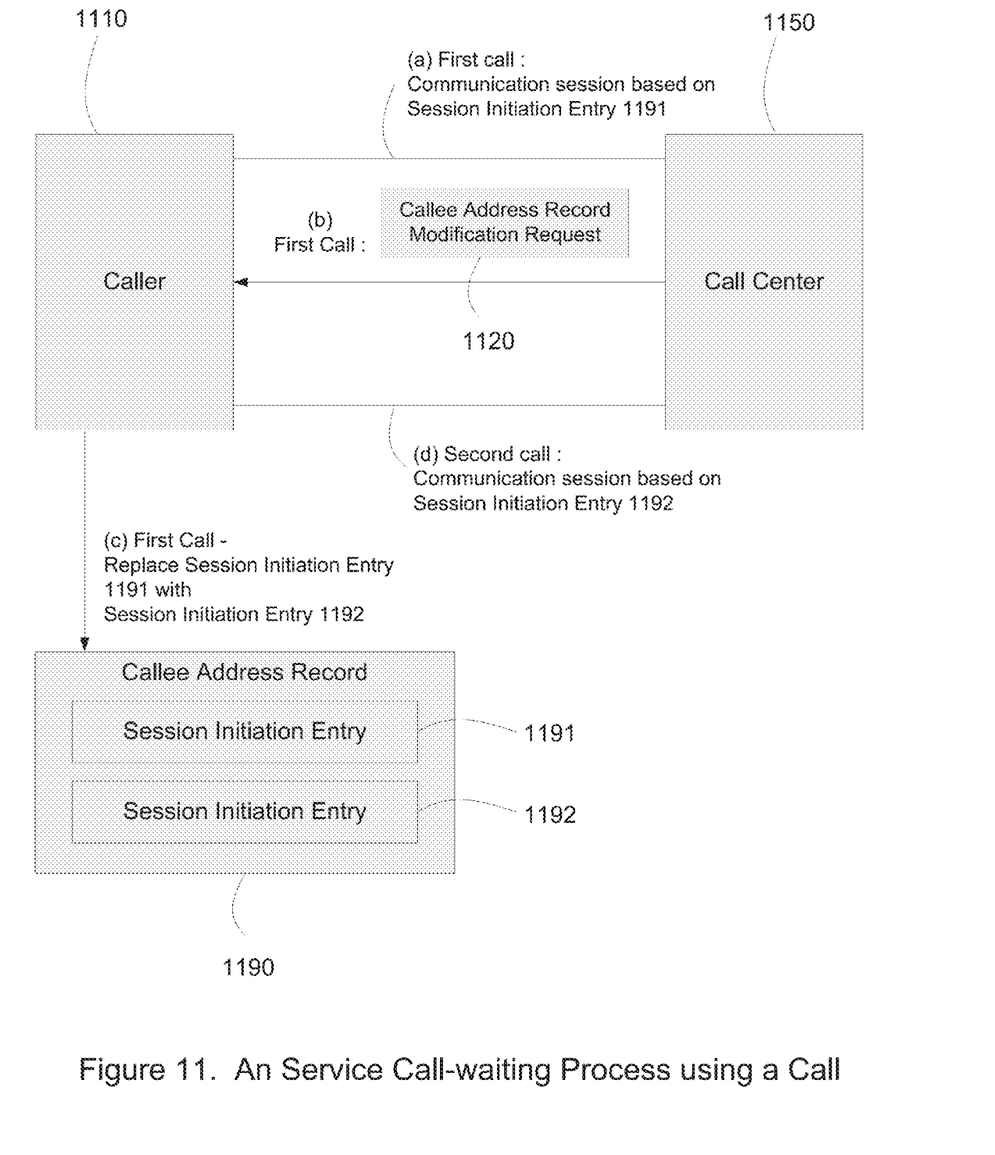
FIG. 11 illustrates a service call-waiting process.

FIG. 11 illustrates a service call-waiting process. A Caller calls a Call Center for a service.

Caller 1110 makes a first call to Call Center 1150 using Callee Address Record 1190 (step (a)). Callee Address Record 1190 includes a Session Initiation Entry 1191. In one embodiment, Session Initiation Entry 1191 includes Session Address Attribute with a telephone number "800-828-1096" and session communication method "SIP". Caller 1110 establishes a communication session using the telephone number "800-828-1096" and session communication method "SIP".

Caller 1110 receives from Call Center 1150 a Callee Address Record Modification Request 1120 for the modification of Callee Address Record 1190 (step (b)). In one embodiment, the Callee Address Record Modification Request includes a Session Initiation Entry Modification Request 1120 for the replacement of Session Initiation Entry 1191 with Session Initiation Entry 1192. In one embodiment, Session Initiation Entry 1192 includes Session Address Attribute with a telephone number "800-828-1096", session communication method "SIP", and Session Data Attribute "CALL_ARRIVAL_TIME=0930 pm:July:20:2005". In one embodiment, the Session Data Attribute corresponds to the arrival time of the first call.

Caller 1110 replaces Session Initiation Entry 1191 with Session Initiation Entry 1192 (step (c)).

About fifty minutes later, Caller 1110 makes a second call to Call Center 1150 using Callee Address Record 1190 (step (d)). The modified Callee Address Record 1190 includes Session Initiation Entry 1192. Caller 1110 establishes a communication session using the telephone number "800-828-1096" and session communication method "SIP". Caller 1110 sends "CALL_ARRIVAL_TIME=0930 pm:July:20:2005" to Call Center 1150 over the communication session.

In one embodiment, Caller 1110 receives service from a customer service representative of Call Center 1150 immediately.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A method for conducting a business transaction, comprising:
   (a) establishing, by a customer telephone, a first group of sessions with a merchant system using a first merchant address record for a merchant, the first merchant address record comprising a session data and a first session address for the merchant, the first group of sessions comprising a first voice session and a first session;
   (b) during the first voice session, performing one or more steps in a business transaction between the customer telephone and the merchant system;
   (c) during the first voice session, receiving over the first session, by the customer telephone from the merchant system, a second merchant address record for the merchant comprising a modified session data associated with the one or more steps in the business transaction, a second session address for the merchant different from the first session address, and an effective time duration for establishing a second group of sessions with the merchant system using the second merchant address record;
   (d) disconnecting the first group of sessions by the customer telephone prior to establishing the second group of sessions;
   (e) comparing a current time with the effective time duration by the customer telephone;
   (f) when the current time is within the effective time duration,
      (f1) establishing the second group of sessions by the customer telephone to the merchant system using the second session address, the second group of sessions comprising a second voice session and a second session;
      (f2) during the second voice session, sending the modified session data by the customer telephone to the merchant system over the second session; and
      (f3) during the second voice session, performing one or more next steps in the business transaction using the modified session data; and
   (g) when the current time is not within the effective time duration, establishing the second group of sessions by the customer telephone using a third merchant address record for the merchant.

2. The method of claim 1, wherein the second merchant address record expires after the effective time duration.

3. The method of claim 1, wherein the second merchant address record comprises business transaction information, wherein the business transaction information is used by the merchant system to retrieve the business transaction.

4. The method of claim 1, wherein the second merchant address record comprises a mechanism for establishing the second group of sessions.

5. The method of claim 4, wherein the mechanism comprises one or more of the following: HTTP; SIP; a security mechanism; a telephony mechanism; and a communications protocol.

6. The method of claim 1, wherein the one or more steps in the business transaction comprises an ordering step, wherein the one or more next steps in the business transaction comprises a reporting of an ordering status.

7. A system, comprising:
a customer telephone for:
    establishing a first group of sessions with a merchant system using a first merchant address record for a merchant, the first merchant address record comprising a session data and a first session address for the merchant, the first group of sessions comprising a first voice session and a first session;
    during the first voice session, performing one or more steps in a business transaction between the customer telephone and the merchant system;
    during the first voice session, receiving over the first session from the merchant system a second merchant address record for the merchant comprising a modified session data associated with the one or more steps in the business transaction, a second session address for the merchant different from the first session address, and an effective time duration for establishing a second group of sessions with the merchant system using the second merchant address record;
    disconnecting the first group of sessions prior to establishing the second group of sessions;
    comparing a current time with the effective time duration;
    when the current time is within the effective time duration,
        establishing the second group of sessions to the merchant system using the second session address, the second group of sessions comprising a second voice session and a second session;
        during the second voice session, sending the modified session data to the merchant system over the second session; and
        during the second voice session, performing one or more next steps in the business transaction using the modified session data;
    when the current time is not within the effective time duration, establishing the second group of sessions using a third merchant address record for the merchant.

8. The system of claim 7, wherein the second merchant address record expires after the effective time duration.

9. The system of claim 7, wherein the second merchant address record comprises business transaction information, wherein the business transaction information is used by the merchant system to retrieve the business transaction.

10. The system of claim 7, wherein the second merchant address record comprises a mechanism for establishing the second group of sessions.

11. The system of claim 10, wherein the mechanism comprises one or more of the following: HTTP; SIP, a security mechanism; a telephony mechanism; and a communications protocol.

12. The system of claim 7, wherein the one or more steps in the business transaction comprises an ordering step, wherein the one or more next steps in the business transaction comprises a reporting of an ordering status.

13. A method for conducting a business transaction by a customer telephone, comprising:
    (a) establishing a first group of sessions with a merchant system using a first merchant address record for a merchant, the first merchant address record comprising a session data and a first session address for the merchant, the first group of sessions comprising a first voice session and a first session;
    (b) during the first voice session, conducting a business transaction for a product with the merchant system;
    (c) during the first voice session, receiving over the first session from the merchant system a second merchant address record comprising an effective time duration for establishing a second group of sessions with the merchant system using the second merchant address record, a modified session data associated with the business transaction, and a second session address for the merchant different from the first session address;
    (d) disconnecting the first group of sessions prior to establishing the second group of sessions;
    (e) comparing a current time with the effective time duration;
    (f) when the current time is within the effective time duration,
        (f1) establishing the second group of sessions with the merchant system using the second session address, the second group of sessions comprising a second voice session and a second session;
        (f2) during the second voice session, sending the modified session data to the merchant system over the second session; and
        (f3) during the second voice session, receiving a status of the business transaction retrieved by the merchant system using the modified session data; and
    (g) when the current time is not within the effective time duration, establishing the second group of sessions using a third merchant address record for the merchant.

14. The method of claim 13,
wherein the second merchant address record comprises business transaction information, wherein the business transaction information is used by the merchant system to retrieve the business transaction.

15. The method of claim 13, wherein the second merchant address record comprises a mechanism for establishing the second group of sessions.

16. The method of claim 13, wherein the business transaction comprises a product order, wherein the session data is associated with the product order, wherein the receiving (g3) comprises:
    (g3i) during the second voice session, receiving a status of the product order, retrieved by the merchant system using the session data.

17. The method of claim 1, wherein the performing (b) comprises:
    (b1) during the first voice session, sending the session data by the customer telephone to the merchant system over the first session.

18. The system of claim 7, wherein in performing the one or more steps in the business transaction during the first voice session, the customer telephone sends the session data to the merchant system over the first session.

19. The method of claim 13, wherein the conducting (b) comprises:
    (b1) during the first voice session, sending the session data to the merchant system over the first session.

20. The method of claim 1, wherein the establishing (g) comprises:
- (g1) when the current time is not within the effective time duration, establishing the second group of sessions by the customer telephone using a third session address for the merchant comprised in the third merchant address record, the third session address being different from the first and second session addresses.

21. The system of claim 7, wherein when the current time is not within the effective time duration, establishing the second group of sessions by the customer telephone using a third session address for the merchant comprised in the third merchant address record, the third session address being different from the first and second session addresses.

22. The method of claim 13, wherein the establishing (g) comprises:
- (g1) when the current time is not within the effective time duration, establishing the second group of sessions by the customer telephone using a third session address for the merchant comprised in the third merchant address record, the third session address being different from the first and second session addresses.

\* \* \* \* \*